United States Patent
Ike et al.

(10) Patent No.: US 9,079,226 B2
(45) Date of Patent: Jul. 14, 2015

(54) HIGH-PRESSURE LIQUID JET CLEANER AND HIGH-PRESSURE LIQUID JET CLEANING METHOD FOR CLEANING THIN FILM SOLAR CELL PANEL

(75) Inventors: Hideaki Ike, Kobe (JP); Keiji Tsujita, Kobe (JP); Hideyuki Tanaka, Kobe (JP); Morimasa Kuge, Kobe (JP); Mitsuru Nomura, Kobe (JP); Masaaki Tomonaga, Amagasaki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 26 days.

(21) Appl. No.: 13/263,625

(22) PCT Filed: Mar. 31, 2010

(86) PCT No.: PCT/JP2010/002385
§ 371 (c)(1),
(2), (4) Date: Dec. 14, 2011

(87) PCT Pub. No.: WO2010/116691
PCT Pub. Date: Oct. 14, 2010

(65) Prior Publication Data
US 2012/0125365 A1      May 24, 2012

(30) Foreign Application Priority Data
Apr. 7, 2009   (JP) ................... 2009-093207

(51) Int. Cl.
*B08B 3/02*    (2006.01)
*F24J 2/46*    (2006.01)
*H02S 40/10*   (2014.01)

(52) U.S. Cl.
CPC ............. *B08B 3/022* (2013.01); *B08B 3/024* (2013.01); *F24J 2/461* (2013.01); *H02S 40/10* (2014.12); *Y02E 10/40* (2013.01); *Y02E 10/50* (2013.01)

(58) Field of Classification Search
USPC .................... 134/122 R, 166 R, 198, 199
See application file for complete search history.

(56) References Cited

U.S. PATENT DOCUMENTS 6,365,531 B1    4/2002  Hayashi et al.
6,506,260 B1 *  1/2003  Hiraishi et al. ................. 134/15
(Continued)

FOREIGN PATENT DOCUMENTS

EP          0 189 902 A2     8/1986
JP         A-2000-349059    12/2000
(Continued)

OTHER PUBLICATIONS

"Erekutoronikusu wo Sasaeru Senjou Gijutsu (Cleaning Technology Supporting Electronics)", Toray Research Center, Inc., Research and Study Department, pp. 27-28, Jan. 2007 (with translation).
(Continued)

*Primary Examiner* — Jason Ko
(74) *Attorney, Agent, or Firm* — Oliff PLC (57) ABSTRACT

A high-pressure liquid jet cleaner removes particles adhered to the inside of scribe lines formed at consistent intervals in a thin film solar cell panel and prevents the surface of a thin film formed at the surface of the solar cell panel from being damaged or detached. Jet nozzles are arranged at consistent intervals in the longitudinal direction of a nozzle holder, corresponding to positions of the respective scribe lines. The nozzle holder is supported by supports provided at both ends of the nozzle holder to allow the nozzle holder to move in the longitudinal direction. While the solar cell panel is conveyed parallel to the scribe lines, a high-pressure liquid is jetted out in a straight line from the jet nozzles to the respective scribe lines for cleaning, such that the high-pressure liquid jetting direction of each jet nozzle is parallel to that of the other jet nozzles.

10 Claims, 7 Drawing Sheets

(56) References Cited

U.S. PATENT DOCUMENTS

| | | | |
|---|---|---|---|
| 6,726,777 B1 | 4/2004 | Sonoda et al. | |
| 2006/0048800 A1* | 3/2006 | Rast et al. | 134/56 R |
| 2006/0281326 A1 | 12/2006 | Ose et al. | |
| 2007/0271756 A1* | 11/2007 | Aoki et al. | 29/281.5 |
| 2011/0197939 A1* | 8/2011 | Aoki et al. | 134/198 |

FOREIGN PATENT DOCUMENTS

| | | |
|---|---|---|
| JP | A-2001-44466 | 2/2001 |
| JP | A-2001-044467 | 2/2001 |
| JP | 2002-045803 | 2/2002 |
| JP | A-2002-148818 | 5/2002 |
| JP | A-2005-211897 | 8/2005 |
| JP | A-2006-122784 | 5/2006 |
| KR | 2003029279 A * | 4/2003 |
| KR | 10-2003-0029279 | 4/2013 |
| WO | WO 01/00336 A1 | 1/2001 |

OTHER PUBLICATIONS

May 11, 2010 International Search Report issued in International Application No. PCT/JP2010/002385 (with translation).

Nov. 15, 2013 Supplemental European Search Report issued in EP 10 76 1397.

Chinese Office Action issued in Chinese Patent Application No. 201080012131.1 dated Mar. 19, 2014 (w/ partial translation).

* cited by examiner

HIGH-PRESSURE LIQUID JET CLEANER AND HIGH-PRESSURE LIQUID JET CLEANING METHOD FOR CLEANING THIN FILM SOLAR CELL PANEL

RELATED APPLICATION

This application claims priority to Japanese Patent Application No. 2009-093207 filed on Apr. 7, 2009, the entire content of which is hereby incorporated by reference.

TECHNICAL FIELD

The present invention mainly relates to a high-pressure liquid jet cleaner for use in cleaning a thin film solar cell panel. The high-pressure liquid jet cleaner is configured to jet out a high-pressure liquid to a thin film solar cell panel to remove particles (e.g., fine particles, organic matter, and metal impurities on the surface of a glass substrate that are produced during the fabrication of the solar cell panel) adhered to the inside of scribe lines (shallow vertical grooves) which are formed in the thin film solar cell panel in its width direction at consistent intervals.

BACKGROUND ART

The fabrication of such a thin film solar cell panel as described above includes the steps of: receiving a glass plate on which a transparent electrode film (i.e., TCO film) is formed; forming scribe lines in the transparent electrode film with a laser; forming, on the transparent electrode film, a semiconductor photoelectric conversion layer from silicon and the like through CVD; forming scribe lines in the semiconductor photoelectric conversion layer with the laser; forming a conductor film on the semiconductor photoelectric conversion layer; and forming scribe lines in the conductor film and the semiconductor photoelectric conversion layer with the laser. After these steps are performed, a glass plate is affixed to the back side. Prior to affixing the glass plate, cleaning work is necessary for removing particles. As shown in FIG. 6C, if particles 99 are adhered to the inside of a scribe line 102, then insulation failure occurs between photoelectric conversion element layers (photoelectric conversion cells) 101 which are serially connected. As a result, an intended amount of power generation cannot be obtained. In this respect, conventionally, a roller brush has been used for removing particles from the inside of scribe lines (see Non Patent Literature 1, for example). The roller brush is used in the following manner: press the brush that is rotating into a scribe line while applying a cleaning liquid to the brush; and then move the target for cleaning in relation to the brush, thereby scrubbing particles away from the inside of the scribe line.

As one of conventional cleaning devices using such a roller brush, there is proposed a cleaning device as follows: a thin film solar cell panel, which is a target for cleaning, is placed on a conveyor such that scribe lines, which divide the solar cell panel, are parallel to the running direction of the conveyor; the conveyor runs, and as a result, the solar cell panel is guided into a water cleaning chamber; in the water cleaning chamber, a conductive brush is set to face the upper face of the conveyor, and cleaning water is jetted out from nozzle holes of a jet nozzle mechanism; and accordingly, while the conveyor is running, the solar cell panel is cleaned with the cleaning water jetted out from the nozzle holes, and the tip of the conductive brush slides on a photoelectric conversion cell collection area and its peripheral areas of the solar cell panel, thereby rendering these areas electrically conductive and keeping their electric potentials equal (see Patent Literature 1, for example).

CITATION LIST

Non Patent Literature

NPL 1: "Erekutoronikusu we Sasaeru Senjou Gijutsu (Cleaning Technology Supporting Electronics)", January 2007 (publisher: Toray Research Center, Inc., Research and Study Department) (pp. 27-28)

Patent Literature

PTL 1: Japanese Laid-Open Patent Application Publication No. 2001-044467 (Paragraph 0028 to 0031 and FIG. 1 to FIG. 3)

SUMMARY OF INVENTION

Technical Problem

However, the above method where the particles are removed from the inside of the scribe lines of the solar cell panel by using the roller brush has problems described below.

Figure 6A:
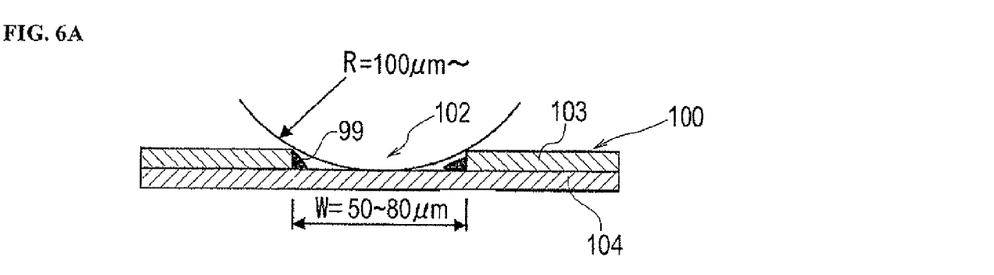
FIG. 6A is a cross-sectional view schematically showing a part of a conventional general thin film solar cell panel in an enlarged manner, illustrating a roller brush in relation to the width of a scribe line.

Firstly, as shown in FIG. 6A, the diameter R of the roller brush is 100 μm or greater although the width W of each scribe line 102 is 50 to 80 μm. Therefore, the particles 99 adhered to the corners within the scribe lines 102 are difficult to remove with the brush. In addition, the diameter of the bristles of the roller brush is relatively large, which also makes it difficult to remove the particles 99 from the inside of the scribe lines 102.

Secondly, the roller brush, which is pressed against the surface of the transparent electrode film within the scribe lines, scrubs away the particles while rotating. Therefore, if foreign matter is caught in the brush, the thin film may be damaged. Moreover, if the roller brush is worn, then maintenance work is necessary, such as the adjustment of the height position of the brush in relation to the panel, or the replacement of the brush. Thus, onerous work is required in order to operate the roller brush.

There is another proposed high-pressure liquid jet cleaner configured to jet out a cleaning liquid from nozzle holes to apply the cleaning liquid at a pressure of 20 to 200 kg/cm$^2$ to a wafer or a mask surface, thereby removing particles. However, such a cleaning device is usually configured to jet out the high-pressure liquid to the entire surface of a solar cell panel for cleaning. Therefore, it is difficult for the device to jet out the high-pressure liquid in such a focused manner that the liquid is applied only to the inside of the scribe lines so that particles can be assuredly removed. Moreover, in the high-pressure liquid jet cleaner, if the pressure at which the high-pressure liquid is jetted out from the nozzle holes is increased excessively for the purpose of improving the particle removing capability, there is a fear that the thin film formed at the surface of the solar cell panel may be detached.

The present invention has been made in view of the above problems. An object of the present invention is to provide a high-pressure liquid jet cleaner for use in cleaning a thin film solar cell panel, which is capable of assuredly removing particles adhered to the inside of a large number of scribe lines formed at consistent intervals in the thin film solar cell panel and which eliminates a fear that the surface of a thin film formed at the surface of the solar cell panel may be damaged or that the thin film may be detached.

Solution to Problem

In order to achieve the above object, a high-pressure liquid jet cleaner for use in cleaning a thin film solar cell panel, according to the present invention, includes: a plurality of high-pressure liquid jet nozzles each configured to jet out a high-pressure liquid in a straight line to a corresponding one of a plurality of scribe lines to clean the scribe lines which continuously extend in a direction perpendicular to the width direction of the thin film solar cell panel and which are arranged in the width direction at consistent intervals; a nozzle holder holding the plurality of jet nozzles which are arranged in the longitudinal direction of the nozzle holder and which correspond to the respective scribe lines; a support configured to support the nozzle holder; and a conveyor configured to convey the solar cell panel in relation to the nozzle holder in a direction that is perpendicular to the longitudinal direction of the nozzle holder and that is parallel to the direction in which the scribe lines of the solar cell panel extend continuously.

Figure 6B:
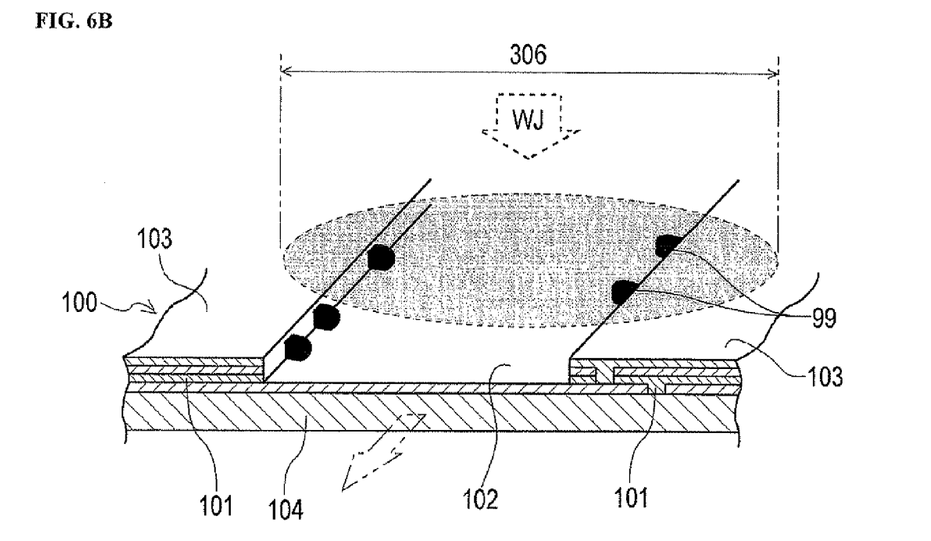
FIG. 6B is a partially cross-sectional perspective view showing in detail a part of the thin film solar cell panel in a further enlarged manner, illustrating the external diameter of a high-pressure liquid applied to the solar cell panel in relation to the width of a scribe line.
Figure 6C:
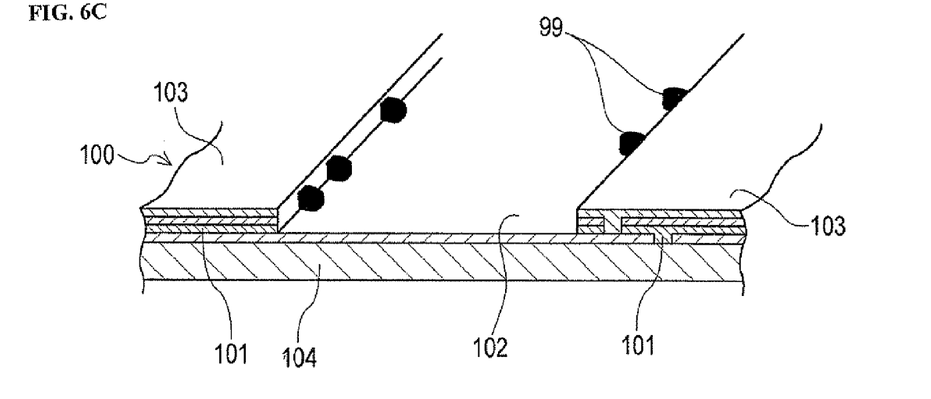
FIG. 6C is a partially cross-sectional perspective view showing in detail a part of the conventional general thin film solar cell panel in an enlarged manner.

According to the high-pressure liquid jet cleaner having the above configuration, the high-pressure liquid is jetted out in a straight line from a large number of jet nozzles. This realizes high cleaning intensity. Each jet nozzle jets out the high-pressure liquid in a straight line to the corresponding scribe line of the solar cell panel, such that the high-pressure liquid jetting direction of each jet nozzle is parallel to that of the other jet nozzles. As a result, the high-pressure liquid hits the inside of each scribe line of the solar cell panel, and particles that are present within each scribe are removed in a manner similar to scrubbing away. Here, the solar cell panel is conveyed in relation to the nozzle holder in a direction parallel to the scribe lines. Accordingly, when the high-pressure liquid is jetted out in a straight line and applied to the inside of each scribe line, particles within the scribe line are removed. It should be noted that, as shown in FIG. 6B, the external diameter 306 (in the embodiments below) of the high-pressure liquid that is jetted out in a straight line from one jet nozzle 3 is, for example, approximately 140 μm when hitting the surface of the solar cell panel 100. This is slightly greater than the width of each scribe line 102.

Preferably, in the high-pressure liquid jet cleaner, the support supports the nozzle holder in a manner to allow the nozzle holder to move in the longitudinal direction of the nozzle holder, and the support includes a micro-positioning device configured to move the nozzle holder in the longitudinal direction by a micro distance for positioning the jet nozzles. It should be noted that the term "positioning" herein refers to adjusting the position at which the high-pressure liquid jetted out from one jet nozzle hits the solar cell panel, such that the adjusted position coincides with the position of the scribe line that corresponds to the one jet nozzle. Accordingly, if the positions at which the high-pressure liquid jetted out from the jet nozzles of the nozzle holder hits the solar cell panel are displaced from the positions of the corresponding scribe lines due to the solar cell panel being conveyed, then the micro-positioning device may be used to adjust the position at which the high-pressure liquid jetted out from one jet nozzle hits the solar cell panel, such that the adjusted position precisely coincides with the position of the scribe line that corresponds to the one jet nozzle. Here, if the position at which the high-pressure liquid jetted out from one jet nozzle of the nozzle holder hits the solar cell panel is adjusted to coincide with the position of the corresponding scribe line of the solar cell panel, then the high-pressure liquid jetted out from the nozzle holder precisely hits all the scribe lines of the solar cell panel.

Further, in the high-pressure liquid jet cleaner, a pressure at which the high-pressure liquid is jetted out from the jet nozzle may be variable. According to this configuration, the pressure at which the high-pressure liquid is jetted out can be adjusted in accordance with the hardness of a thin film such as a transparent electrode that is exposed at the surface within each scribe line of the solar cell panel. Thus, the jetting pressure of the high-pressure liquid can be set to a level that does not cause detachment of the thin film even when the thin film is hit by the high-pressure liquid.

Still further, in the high-pressure liquid jet cleaner, the support is configured to support the nozzle holder in a manner to allow the nozzle holder to rotate around an axis extending in the longitudinal direction of the nozzle holder, such that a direction in which the high-pressure liquid is jetted out from the jet nozzles is adjustable. According to this configuration, an angle at which the high-pressure liquid hits the solar cell panel is adjustable so as to allow the high-pressure liquid to be applied to the thin-film-exposed surface within each scribe line of the solar cell panel not only vertically from directly above but also at an angle (at 45° or less, or at 30° or less, with respect to the thin-film-exposed surface). This makes it possible to efficiently remove particles from the inside of the scribe lines.

Still further, in the high-pressure liquid jet cleaner, the nozzle holder may include a high-pressure liquid supply path, which continuously extends in the longitudinal direction of the nozzle holder and which communicates with the plurality of jet nozzles. The high-pressure liquid supply path may be connected to one end of a flexible high-pressure liquid supply tube, through which the high-pressure liquid is supplied to the high-pressure liquid supply path. According to this configuration, even if the nozzle holder is moved in its longitudinal direction in relation to the support, the flexible high-pressure liquid supply tube is bent when the nozzle holder is moved and thereby absorbs the displacement of an end portion of the nozzle holder. Then, the high-pressure liquid that has been supplied into the high-pressure liquid supply path through the high-pressure liquid supply tube is jetted out as a cleaning liquid at substantially the same high pressure from each jet nozzle which communicates with the high-pressure liquid supply path.

The high-pressure liquid jet cleaner may further include a second nozzle holder which holds at least one second nozzle configured to jet out a liquid in a fan-like diffused manner to a surface of the solar cell panel at a pressure lower than the pressure of the high-pressure liquid. The high-pressure liquid jet cleaner configured in this manner makes it possible to clean the scribe lines of the solar cell panel and the surface of the solar cell panel at the same time.

Advantageous Effects of Invention

The high-pressure liquid jet cleaner according to the present invention, which is configured in the above manner, provides excellent advantageous effects described below. Firstly, conductive and semi-conductive particles adhered to the inside of each scribe line of the solar cell panel are assuredly removed. This prevents, for example, short-circuiting between photoelectric conversion elements, which may cause deterioration in the quality of the solar cell panel.

Secondly, the high-pressure liquid is jetted out in such a manner that the liquid is precisely applied only to the position of each scribe line, and its peripheral areas, of the solar cell panel for cleaning. This eliminates a fear that any thin film other than the thin film within the scribe lines, such as a thin film at the external surface of the solar cell panel, may be detached or damaged.

Thirdly, the high-pressure liquid is jetted out in such a focused manner that the liquid is applied only to the inside of the scribe lines of the solar cell panel, and thereby particles are removed from the inside of the scribe lines. In this manner, even particles adhered to the corners within the each scribe can be assuredly removed. Thus, cleaning can be performed efficiently.

Fourthly, a fear of, for example, detachment of films due to an excessive increase in the pressure of the high-pressure liquid, which causes a negative effect on the quality of the solar cell panel, is eliminated not only for the thin film within the scribe lines of the solar cell panel but also for the thin film at the external surface of the solar cell panel.

DESCRIPTION OF EMBODIMENTS

Hereinafter, embodiments of a high-pressure liquid jet cleaner according to the present invention are described.

Embodiment 1

Figure 1:
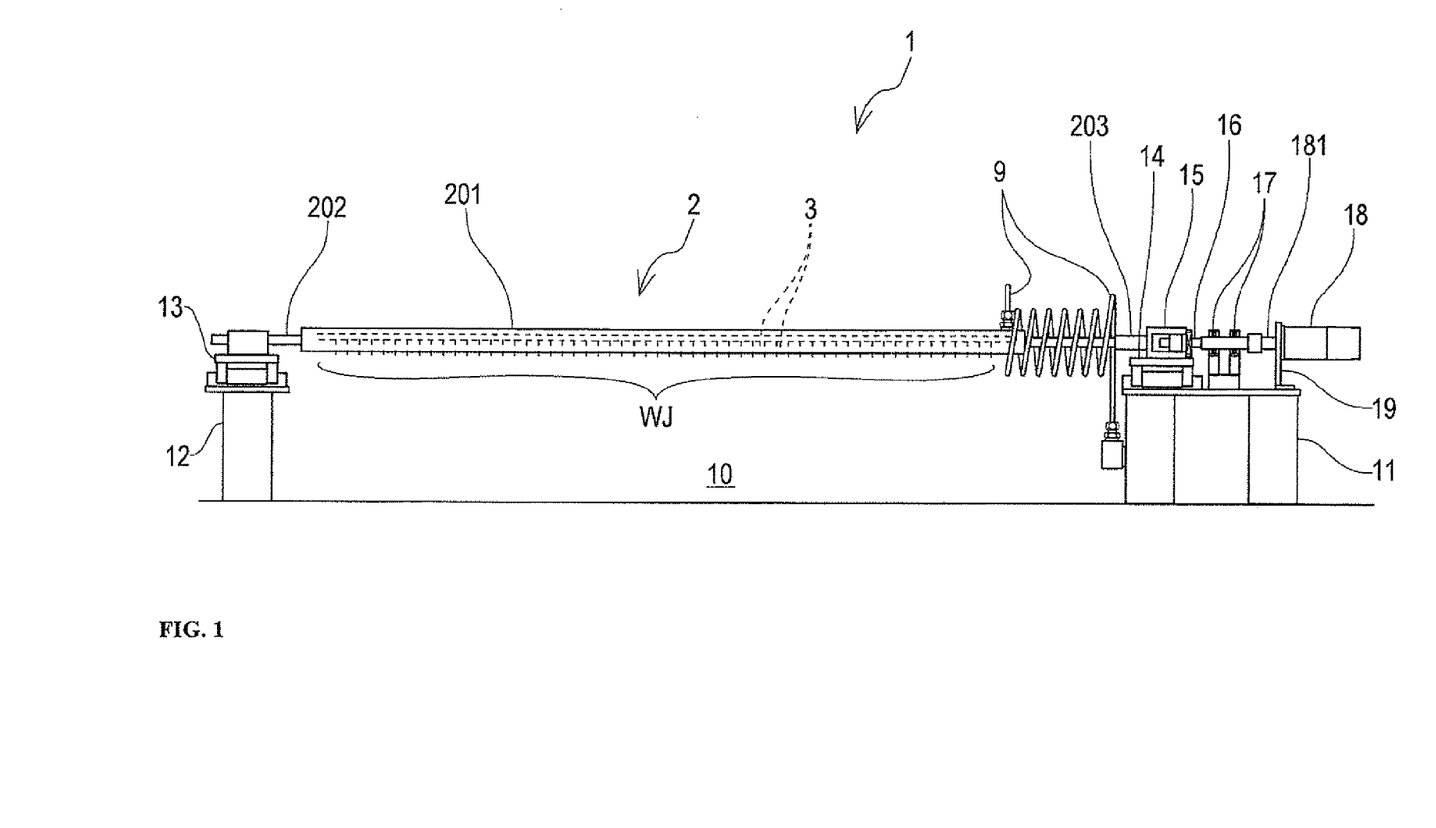
FIG. 1 is a front view showing a high-pressure liquid jet cleaner for use in cleaning a thin film solar cell panel, according to Embodiment 1 of the present invention.

As shown in FIG. 1, a high-pressure liquid jet cleaner 1 according to Embodiment 1 is a stationary cleaning device which includes a nozzle holder 2. The nozzle holder 2 holds a large number of high-pressure liquid jet nozzles 3 which are arranged at the lower face of the nozzle holder 2 at consistent intervals 305 (see FIG. 5). The interval 305 between jet nozzles 3 corresponds to a distance between scribe lines 102 that are adjacent to each other. In the description below, the distance between adjacent scribe lines 102 is referred to as a scribe width. A body 201, which is the body of the nozzle holder 2, is in a square pillar shape which is rectangular when seen from above. A large number of high-pressure liquid jet nozzles 3 are arranged at the lower face of the nozzle holder 2 at consistent intervals. In the description below, the direction in which the multiple nozzles 3 are arranged in a row is referred to as the "longitudinal direction" of the nozzle holder body 201. The length of the nozzle holder body 201 in the longitudinal direction is slightly longer than the width of a solar cell panel 100 which is a target for cleaning. The multiple jet nozzles 3 are attached to the lower face of the nozzle holder body 201 in a manner to sufficiently cover the width of the solar cell panel 100 so that a high-pressure liquid can be jetted to, at least, all the scribe lines 102 of the solar cell panel 100.

Figure 4:
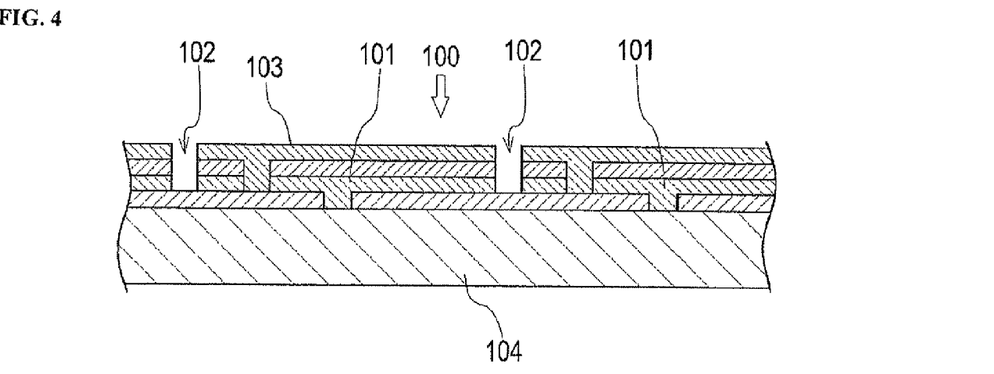
FIG. 4 is a cross-sectional view which is an enlarged view showing a part of the thin film solar cell panel.
Figure 5:
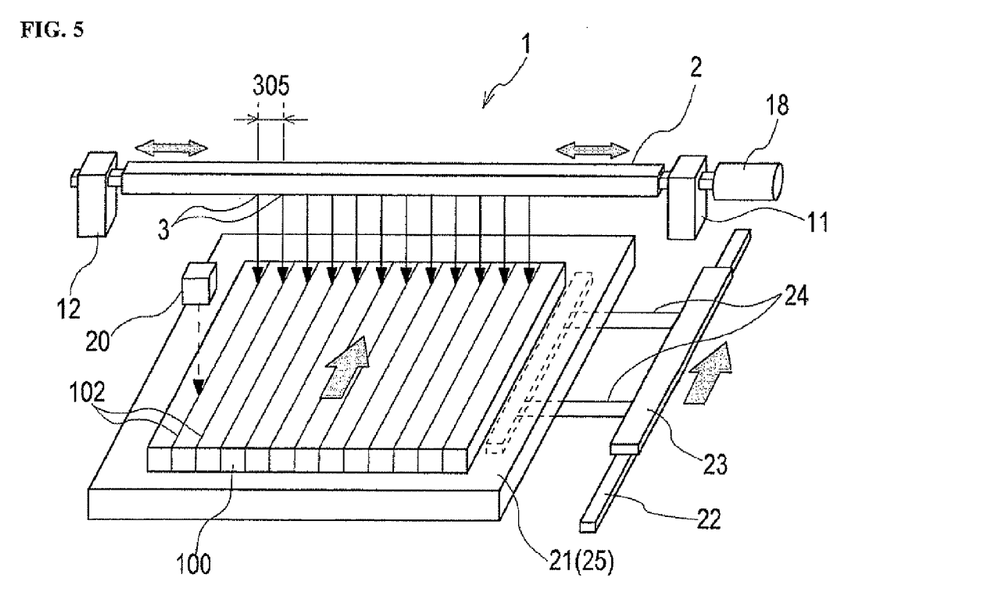
FIG. 5 schematically shows, in perspective view from the front and above, the high-pressure liquid jet cleaner according to Embodiment 1 of the present invention.

As shown in FIG. 4, the solar cell panel 100, which is cleaned by the high-pressure liquid jet cleaner 1 according to the present embodiment, is formed such that photoelectric conversion element layers 101 each having a width of approximately 10 mm are arranged on a plate glass 104. The photoelectric conversion element layers 101 are arranged such that adjacent photoelectric conversion element layers 101 are serially connected to each other with a scribe line 102 formed therebetween. The scribe line 102 has a width of approximately 50 to 80 µm. The width of the solar cell panel 100 may be approximately 2200 mm, for example. As shown in FIG. 5, a large number of (e.g., approximately 100 to 200) scribe lines 102 are arranged in the width direction of the solar cell panel 100. Each scribe line 102 continuously extends in a direction that is perpendicular to the width direction of the solar cell panel 100 (hereinafter, the direction perpendicular to the width direction of the solar cell panel 100 is referred to as the "length direction" of the scribe lines 102).

Figure 2A:
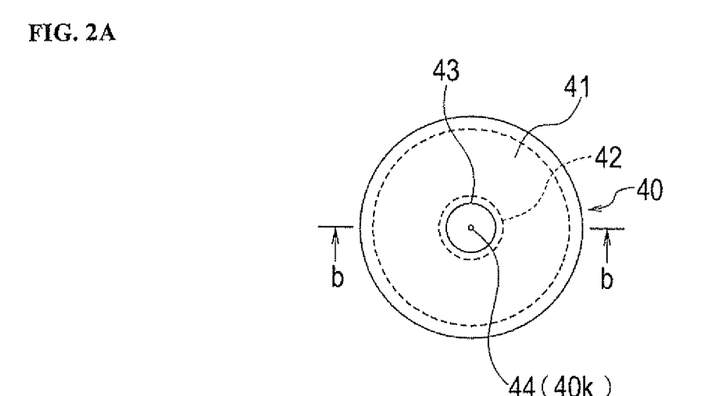
FIG. 2A is a front view showing a high-pressure liquid jet nozzle 40 used in a cleaner 1 of the present invention.
Figure 2B:
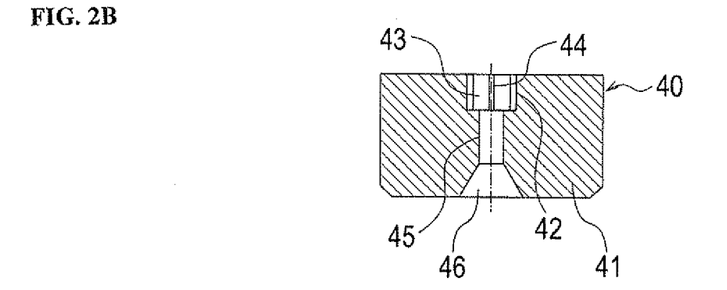
FIG. 2B is a cross-sectional view along line b-b in FIG. 2A.

The jet nozzles 3 are arranged at consistent intervals in the longitudinal direction of the nozzle holder body 201 of the high-pressure liquid jet cleaner 1, such that each nozzle interval 305 aligns with a respective scribe width at the positions of corresponding scribe lines 102 of the solar cell panel 100. FIG. 2A is a front view showing a high-pressure liquid jet nozzle 40, which is used in the cleaner 1 of the present invention, and FIG. 2B is a cross-sectional view along line b-b in FIG. 2A. As shown in FIG. 2A, a nozzle tip 43, which is formed from a gemstone such as diamond or sapphire and in which a jet hole 44 is drilled at its central position, is embedded in a tip hole 42 formed in the central portion of a stainless steel nozzle body 41. The nozzle body 41 is provided with a high-pressure liquid jet hole 40k, from which a high-pressure liquid is jetted out in a straight line. The jet nozzle 40 may be formed to include a tip as described in the present embodiment, or alternatively, formed in such a manner that a nozzle hole is directly formed in a plate of the jet nozzle 40. It should be noted that the hole denoted by the reference numeral 45 is a straight hole, and the hole denoted by the reference numeral 46 is a tapered hole. The tapered hole is formed such that the shorter the distance to its front end, the more the diameter conically increases. Each jet nozzle 3 jets out a high-pressure liquid WJ which is adjusted as shown in FIG. 6B such that the external diameter 306 of the high-pressure liquid WJ is, at a position where the liquid WJ hits the solar cell panel 100, greater than the groove width of the corresponding scribe line 102. As described above, the jet nozzles 3 are arranged at the lower face of the nozzle holder body 201 and the jet holes of the respective jet nozzles 3 face in the downward vertical direction. This allows the jet nozzles 3 to jet out the high-pressure liquid in the downward vertical direction. However, the direction in which the jet holes of the respective jet nozzles 3 face, that is, the direction in which the high-pressure liquid is jetted out from the jet nozzles 3, is not limited to the direction mentioned above. For example, the direction in which the jet holes of the respective jet nozzles 3 face may form an angle θ with the downward vertical direction, such that the high-pressure liquid jetted out from the jet nozzles 3 hits the solar cell panel 100 at an angle corresponding to the angle θ (i.e., 90°−θ). Moreover, the direction in which the jet holes of the respective jet nozzles 3 face may be unfixed, for example. Accordingly, the jet angle of the high-pressure liquid jetted out from the jet nozzles 3 may be adjusted so as to accord with the state of the scribe lines 102 of the solar cell panel 100.

As shown in FIG. 5, the high-pressure liquid jet cleaner 1 according to the present embodiment cleans the solar cell panel 100 while conveying the solar cell panel 100 at a constant speed in a direction perpendicular to the longitudinal direction of the nozzle holder 2 (i.e., perpendicular to the direction in which the multiple jet nozzles 3 are arranged), that is, in a direction parallel to the scribe lines 102. As shown in FIG. 1, a primary support platform 11 and a secondary support platform 12 are set at both sides of a cleaning chamber 10 for cleaning the solar cell panel 100, such that the cleaning chamber 10 is positioned between these support platforms. The nozzle holder 2 is provided in a manner to straddle the support platforms 11 and 12 which are set at both sides of the cleaning chamber 10. The nozzle holder 2 is movably supported by linear motion guides 13 and 14 which are set on the support platforms 11 and 12, such that the nozzle holder 2 is movable in its longitudinal direction. Support poles 202 and 203, each having a quadrangular cross section, extend from both respective sides of the body 201 of the nozzle holder 2. The support platforms 11 and 12, the linear motion guides 13 and 14, and the support poles 202 and 203 forms a support for the body 201 of the nozzle holder 2. At one side of the support (i.e., at the primary support platform 11 side), a ball screw nut 15 is integrally formed on the outer end of the support pole 203, and the distal end of a ball screw shaft 16 is screwed into the nut 15.

The ball screw shaft 16 is rotatably supported by a pair of bearing devices 17 which are set on the primary support platform 11. A stepping motor or servomotor 18 is supported on the primary support platform 11 via an L-shaped stay 19. The proximal end of the ball screw shaft 16 is connected to the distal end of a drive shaft 181 of the stepping motor or servomotor 18 in a manner to allow the shafts 16 and 181 to rotate in an integrated manner. When the ball screw shaft 16 is rotated as predetermined in a specific direction by means of the stepping motor or servomotor 18, the nozzle holder 2 moves by a micro distance in the longitudinal direction. In this manner, a position at which the high-pressure liquid jetted out from one jet nozzle 3 hits the solar cell panel 100 is adjusted to coincide with the position of the scribe line 102 that corresponds to the one jet nozzle 3, and is then fixed. In the present embodiment, as shown in FIG. 5, a scribe line position sensor 20 is attached to the frame, which is not shown, of the cleaning chamber 10. The position at which the scribe line position sensor 20 is attached to the frame is directly above the position, of one scribe line 102 of the solar cell panel 100, at which the high-pressure liquid jetted out from the jet nozzle 3 that is disposed at one end in the longitudinal direction of the nozzle holder 2 (here, the left end in FIG. 5) hits the solar cell panel 100. The position sensor 20 detects, in advance, where the scribe line 102 at the left end of the solar cell panel 100 is located. Then, positioning is performed by means of the stepping motor or servomotor 18 connected to the position sensor 20, such that the high-pressure liquid jetted out from the jet nozzle 3 that is disposed at the left end of the nozzle holder 2 hits the scribe line 102 that is disposed at the left end of the solar cell panel 100. As a result of the positioning, positions at which the high-pressure liquid jetted out from the other jet nozzles 3 held by the nozzle holder 2 hits the solar cell panel 100 coincide with the positions of the other respective scribe lines 102. Accordingly, a belt conveyer, for example, may be used as an apparatus for conveying the solar cell panel 100 in a direction perpendicular to the longitudinal direction of the nozzle holder 2, instead of using a high-precision conveying apparatus such as a linear motion carriage 21, which will be described below. In the above description, the nozzle holder body 201 is supported at both ends in the longitudinal direction. However, depending on the length of the nozzle holder body 201 in the longitudinal direction, the nozzle holder body 201 may be supported at either end. In this case, one end of the nozzle holder body 201 in the longitudinal direction is supported by a support platform in a manner to allow the nozzle holder 2 to move in the longitudinal direction. This eases the construction of the mechanism that allows the movement of the nozzle holder 2 in the longitudinal direction.

As shown in FIG. 5, the solar cell panel 100 is placed on the linear motion carriage 21, and is moved in a direction parallel to the length direction of the scribe lines 102. Accordingly, in the present embodiment, a rail 22 is laid to one side of the cleaning chamber 10 so as to extend in a direction perpendicular to the longitudinal direction of the nozzle holder 2 which is provided in a manner to straddle the support platforms 11 and 12. A conveyor truck 23 runs along the rail 22. The conveyor truck 23 is connected to the linear motion carriage 21 via a pair of connecting members 24. When the conveyor truck 23 runs, the linear motion carriage 21 is conveyed parallel to the rail 22, accordingly. It should be noted that the solar cell panel 100 is fixed onto the linear motion carriage 21 via a suction cup 25, and is conveyed by the linear motion carriage 21.

Figure 2C:
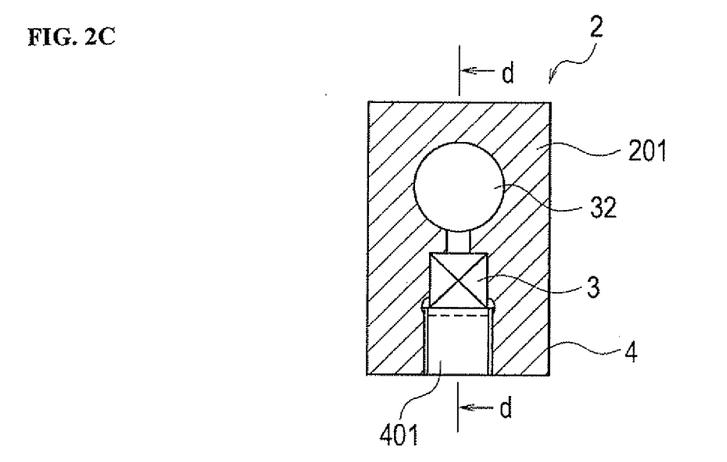
FIG. 2C is a cross-sectional view along line c-c in FIG. 2D, showing a nozzle holder according to the embodiment.
Figure 2D:
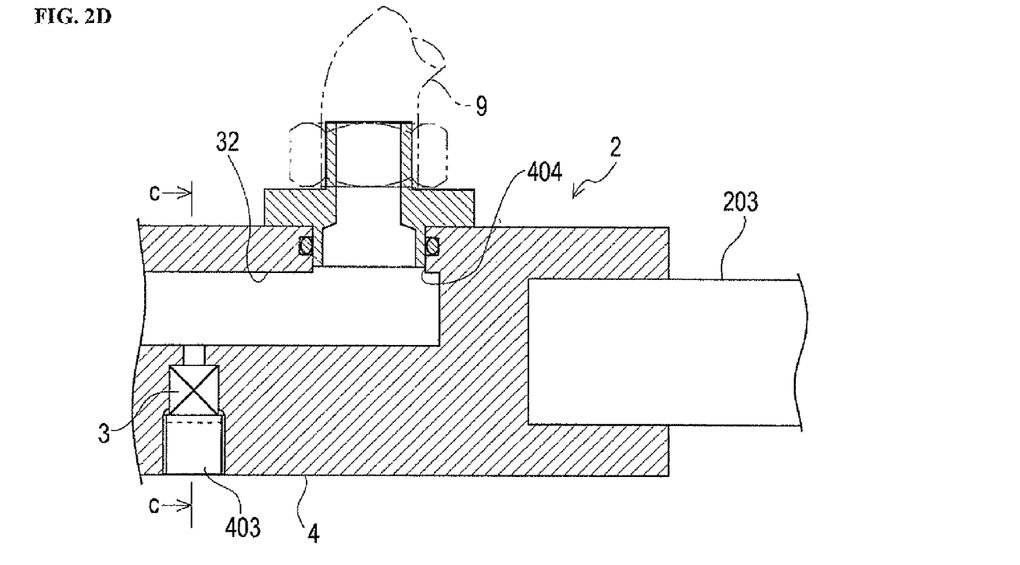
FIG. 2D is a cross-sectional view along line d-d in FIG. 2C.
Figure 3A:
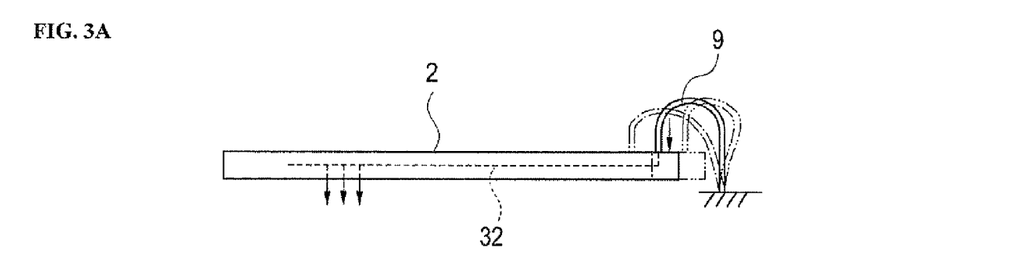
FIG. 3A illustrates a front view of a high-pressure liquid supply tube 9 in a state of being connected to one end of a holder 2.

FIG. 2C and FIG. 2D each show the nozzle holder body 201 according to the present embodiment, which holds a large number of jet nozzles 3 arranged at its lower face. As shown in these diagrams, in the nozzle holder body 201 according to the present embodiment, a high-pressure liquid supply path 32 is provided so as to extend in the longitudinal direction, in the upper part of the long holder body 201 which has a quadrangular cross section. The holder body 201 includes, in its lower part, a nozzle section 4 to which a large number of jet nozzles 3 are attached at a consistent pitch. The nozzle section 4 has openings 403 formed therein. The openings 403 are positioned below the large number of jet nozzles 3, respectively, and the lower ends of the respective jet nozzles 3 are exposed through the openings 403. Moreover, a connection hole 404 which communicates with the high-pressure liquid supply path 32 is formed at one end, in the longitudinal direction, of the lower part of the nozzle holder body 201. One end of the high-pressure liquid supply path 32 is connected to the connection hole 404. The position in which the connection hole 404 is formed is not limited to the above. However, in order to facilitate the piping work of the high-pressure liquid supply path 32 connected to the connection hole 404, it is desired that the connection hole 404 is formed at one end of the upper part of the nozzle holder body 201. It should be noted that in the present embodiment, a high-pressure liquid supply tube 9 (see FIG. 3A) is connected to one end of the high-pressure liquid supply path 32. The high-pressure liquid supply tube 9 is a flexible tube formed from a metal hose, or alternatively from a rubber hose, strengthened by winding its outer circumferential face with a metal blade (wire), i.e., a high-pressure hose.

Figure 3B:
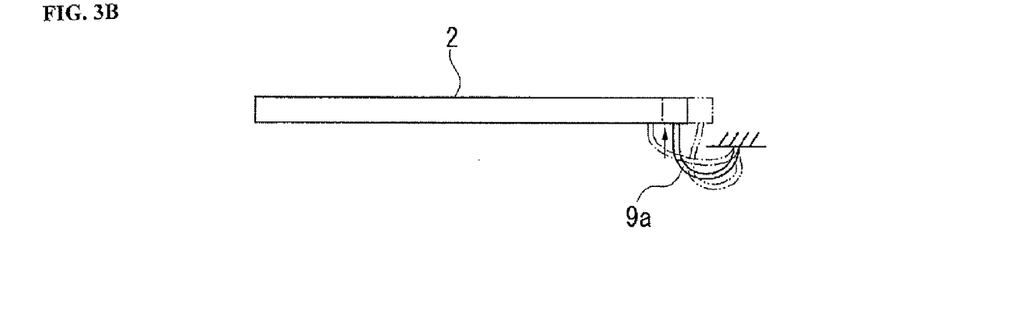
FIG. 3B shows another example of the high-pressure liquid supply tube 9, illustrating a front view of a high-pressure liquid supply tube 9a which is formed of a high-pressure hose and which is in a state of being connected to one end of the holder 2.

The other end of the metal supply tube 9 is connected to a high-pressure liquid supply pump (not shown). The high-pressure liquid supply pump is connected to the one end of the high-pressure liquid supply path 32 of the nozzle holder body 201 via the metal supply tube 9. Accordingly, the high-pressure liquid is supplied to the jet nozzles 3 through the high-pressure liquid supply path 32, and the high-pressure liquid is jetted out from each jet nozzle 3 in a straight line. The high-pressure liquid supply pump applies pressure to water, thereby sending out the water. The pressure at which the high-pressure liquid is jetted out from the jet nozzles 3 can be changed by changing the pump speed, i.e., the output power, of the high-pressure liquid supply pump. As shown in FIG. 1, the high-pressure liquid supply tube 9, which is a metal tube connected to the upper end of one end of the high-pressure liquid supply path 32, has a part that is wound multiple times in a horizontal spiral manner. However, the supply tube 9 need not be in a spiral form if the high-pressure liquid supply path 32 has flexibility. For example, the supply tube 9 in a straight form may be curved in its entirety. FIG. 3B shows a high-pressure liquid supply tube 9a as another example of the high-pressure liquid supply tube formed of a high-pressure hose.

Embodiment 2

Although not shown, in the high-pressure liquid jet cleaner 1 of FIG. 1, the body 201 of the nozzle holder 2 is configured to be rotatable by a predetermined angle around the axes of the support poles 202 and 203 extending from both sides of the body 201.

The high-pressure liquid jet cleaner 1 according to Embodiment 2 is useful particularly in a case where particles 99, which are present within the scribe lines 102 of the solar cell panel 100, are difficult to remove simply by vertically applying the high-pressure liquid from directly above the particles 99. For example, by rotating the nozzle holder body 201, the high-pressure liquid jetting direction and angle may be adjusted so that the high-pressure liquid can be applied to the solar cell panel 100 at a sharp angle while the solar cell panel 100 is conveyed toward the nozzle holder 2 which faces the solar cell panel 100. In the high-pressure liquid jet cleaner 1 according to Embodiment 2, the pressure at which the high-pressure liquid is jetted out from the jet nozzles 3 is adjusted, and at the same time, the angle at which the high-pressure liquid is applied to the solar cell panel 100 as shown in FIG. 6B is adjust. This makes it possible to assuredly remove the particles 99 from the inside of the scribe lines 102, and to perform the removal of the particles 99 efficiently.

Embodiment 3

Figure 7:
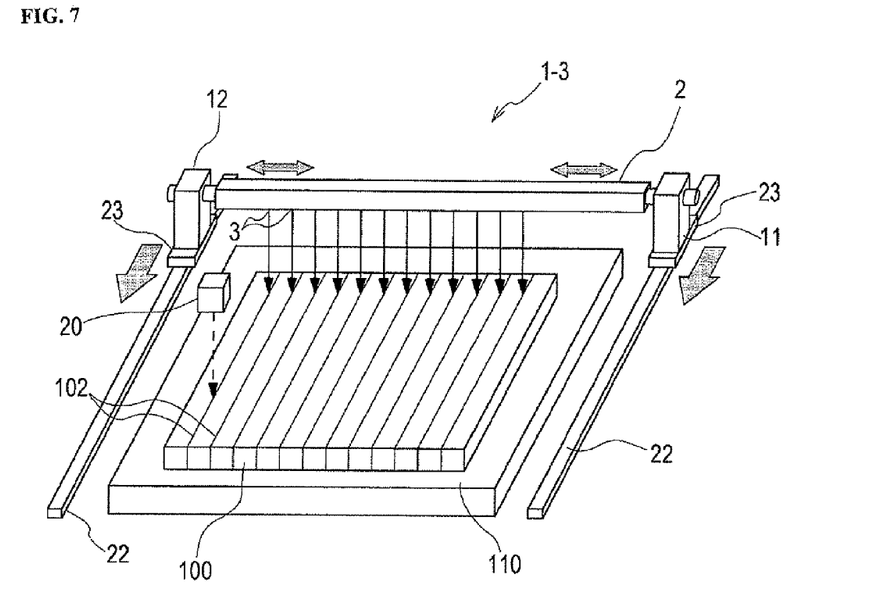
FIG. 7 shows, in perspective view from the front and above, a high-pressure liquid jet cleaner according to Embodiment 3 of the present invention.

FIG. 7 shows, in perspective view from the front and above, a high-pressure liquid jet cleaner according to another embodiment of the present invention. As shown in FIG. 7, a high-pressure liquid jet cleaner 1-3 according to Embodiment 3 is different from the high-pressure liquid jet cleaner 1 according to Embodiment 1 with respect to the points described below. The solar cell panel 100 is placed and fixed at a specific position on a cleaning platform 110, and in such a state, the nozzle holder 2 is moved in the length direction of the scribe lines 102 of the solar cell panel 100.

Accordingly, rails 22 are laid to both sides of the cleaning platform 110. The nozzle holder 2, together with the support platforms 11 and 12, is mounted on conveyor trucks 23 which run along the rails 22. The scribe line position sensor 20 is supported by the nozzle holder 2 via a support member which is not shown. Accordingly, the scribe line position sensor 20 moves together with the nozzle holder 2. Since the other configurational features and the usage of the high-pressure liquid jet cleaner according to Embodiment 3 are the same as those described above in Embodiment 1, the description thereof will be omitted, and the same components as those described in Embodiment 1 are denoted by the same reference signs as those used in Embodiment 1.

Embodiment 4

Figure 8:
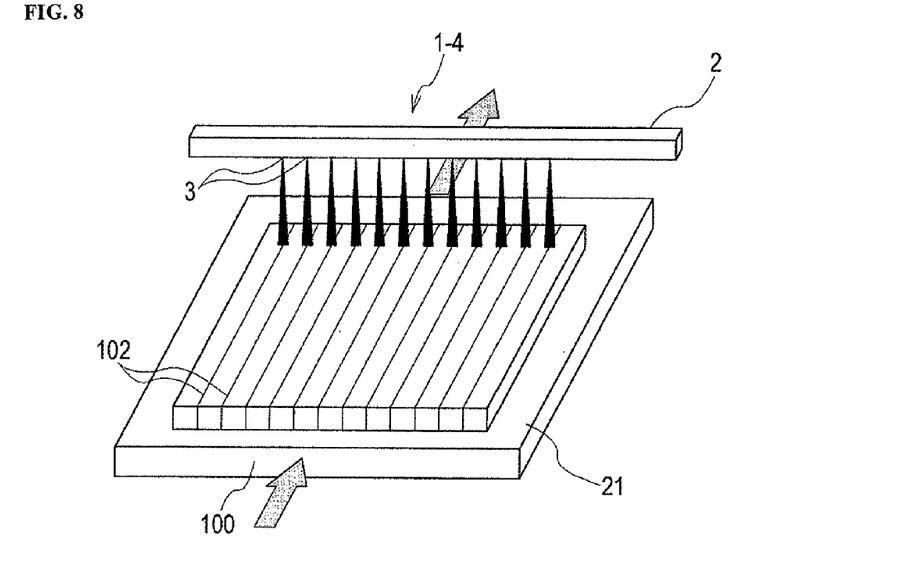
FIG. 8 shows, in perspective view from the front and above, a high-pressure liquid jet cleaner according to Embodiment 4 of the present invention.

FIG. 8 shows, in perspective view from the front and above, a high-pressure liquid jet cleaner according to another further embodiment of the present invention. As shown in FIG. 8, a high-pressure liquid jet cleaner 1-4 according to Embodiment 4 is different from the high-pressure liquid jet cleaner 1 according to Embodiment 1 with respect to the points described below. For the purpose of lowering costs, the high-pressure liquid jet cleaner 1-4 is not provided with: a micro-positioning mechanism which includes the servomotor 18 and the linear motion guides 13 and 14; and the scribe line position sensor 20. Meanwhile, the jet flow of the high-pressure liquid which is jetted out from the jet nozzles 3 of the nozzle holder 2 is slightly diffused downward, or the high-pressure liquid jet diameter is increased, so that the particles 99 within the scribe lines 102 can be removed even if the positions at which the high-pressure liquid is to hit the solar cell panel 100 are slightly deviated from the positions of the respective scribe lines 102. It should be noted that the mechanism for moving the solar cell panel 100 in relation to the nozzle holder 2 may be either the one described in Embodiment 1 or the one described in Embodiment 3. However, the mechanism described in Embodiment 1 is simpler. Since the other configurational features and the usage of the high-pressure liquid jet cleaner according to Embodiment 4 are the same as those described above in Embodiment 1, the description thereof will be omitted, and the same components as those described in Embodiment 1 are denoted by the same reference signs as those used in Embodiment 1.

Embodiment 5

Figure 9:
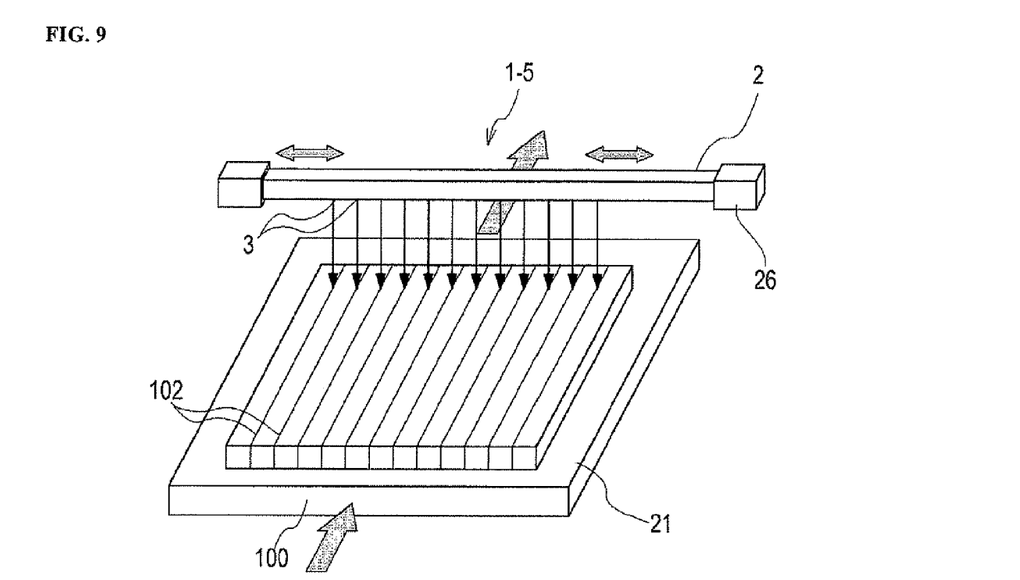
FIG. 9 shows, in perspective view from the front and above, a high-pressure liquid jet cleaner according to Embodiment 5 of the present invention.

FIG. 9 shows, in perspective view from the front and above, a high-pressure liquid jet cleaner according to another further embodiment of the present invention. As shown in FIG. 9, similarly to the high-pressure liquid jet cleaner 1-4 according to Embodiment 4, the configuration of a high-pressure liquid jet cleaner 1-5 according to Embodiment 5 is simplified for the purpose of lowering costs. In Embodiment 4, the jet flow of the high-pressure liquid WJ is slightly diffused downward. Alternatively, in Embodiment 5, an electromagnetic oscillator 26 is attached to one end of the nozzle holder 2, and thereby micro-vibration of the nozzle holder 2 is caused in the longitudinal direction. This makes it possible to remove particles 99 (see FIG. 6B) from the inside of the scribe lines 102 even if the positions at which the high-pressure liquid is to hit the solar cell panel 100 are slightly deviated from the positions of the respective scribe lines 102. It should be noted that the mechanism for moving the solar cell panel 100 in relation to the nozzle holder 2 may be either the one described in Embodiment 1 or the one described in Embodiment 3. However, in Embodiment 5, the solar cell panel 100 is moved by means of the mechanism described in Embodiment 1 since the mechanism described in Embodiment 1 is simpler. Since the other configurational features and the usage of the high-pressure liquid jet cleaner according to Embodiment 5 are the same as those described above in Embodiment 1, the description thereof will be omitted, and the same components as those described in Embodiment 1 are denoted by the same reference signs as those used in Embodiment 1.

Embodiment 6

Figure 10:
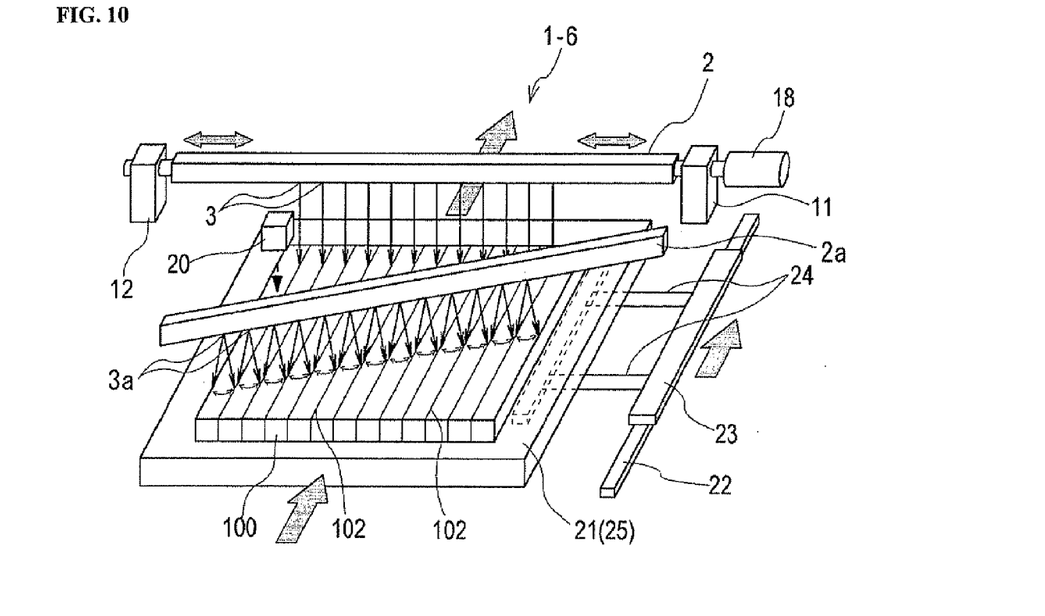
FIG. 10 shows, in perspective view from the front and above, a high-pressure liquid jet cleaner according to Embodiment 6 of the present invention.

FIG. 10 shows, in perspective view from the front and above, a high-pressure liquid jet cleaner according to another further embodiment of the present invention. As shown in FIG. 10, a high-pressure liquid jet cleaner 1-6 according to Embodiment 6 is a result of combining the high-pressure liquid jet cleaner 1 of Embodiment 1 with a cleaning mechanism which includes a nozzle holder 2a. The nozzle holder 2a jets out, to the entire surface of the solar cell panel 100, a low-pressure cleaning liquid which is diffused in a fan-like manner. The nozzle holder 2a is provided in such a manner that the nozzle holder 2a is inclined relative to the width direction of the solar cell panel 100.

The nozzle holder 2a holds multiple jet nozzles 3a. These jet nozzles 3a jet out, to the solar cell panel 100, a cleaning liquid which is diffused in a fan-like manner. The pressure at which the jet nozzles 3a jet out the cleaning liquid is sufficiently lower than the pressure at which the high-pressure liquid jet nozzles 3 of the nozzle holder 2 jet out the cleaning liquid, so that the surface of the solar cell panel 100 is not damaged when cleaned with the cleaning liquid jetted out from the jet nozzles 3a. It should be noted that, instead of including the jet nozzles 3a configured to jet out the cleaning liquid in the fan-like diffused manner, the following alternative configuration may be employed: the jet nozzles 3a jet out a low-pressure cleaning liquid in a straight line; and while the low-pressure cleaning liquid is being jetted out, the nozzle holder 2a rotates around its axis extending in the longitudinal direction in a reciprocating manner within a predetermined rotation angle range (e.g., 30°) by means of, for example, a motor and a piston crank mechanism. According to the high-pressure liquid jet cleaner 1-6 of the present embodiment, the inside of the scribe lines 102 of the solar cell panel 100 is cleaned intensively with the high-pressure cleaning liquid jetted out from the jet nozzles 3 of the nozzle holder 2, and at the same time, the surface of the solar cell panel 100 can be uniformly cleaned with the low-pressure cleaning liquid jetted out from the jet nozzles 3a of the nozzle holder 2a. The pressure of the cleaning liquid jetted out from the jet nozzles 3a is adjusted so that a thin film formed at a film forming part of the solar cell panel 100 will not be damaged. In this manner, the entire solar cell panel 100 can be uniformly cleaned.

While preferred embodiments of the present invention are as described above with reference to the drawings, it will be understood that those skilled in the art, upon attaining an understanding of the foregoing, will readily conceive of various alterations and modifications to these embodiments without departing from the scope of the present invention. Therefore, such alterations and modifications are construed to fall within the scope of the present invention which is defined by the claims.

INDUSTRIAL APPLICABILITY

As described above, according to the high-pressure liquid jet cleaner (and the high-pressure liquid jet cleaning method) of the present invention, particles adhered to the inside of scribe lines (shallow vertical grooves) formed in a thin film solar cell panel can be effectively removed by jetting a high-pressure liquid to the thin film solar cell panel. Thus, the high-pressure liquid jet cleaner is useful as a device for cleaning thin film solar cell panels.

REFERENCE SIGNS LIST 1, 1-3, 1-4, 1-5, 1-6 high-pressure liquid jet cleaner
2 nozzle holder
201 nozzle holder body
202, 203 support pole
3 jet nozzle
4 nozzle section
403 opening
404 connection hole
9, 9a high-pressure liquid supply tube
10 cleaning chamber
110 cleaning platform
11 primary support platform
12 secondary support platform
13, 14 linear motion guide
15 nut
16 ball screw shaft
17 bearing device
18 servomotor
19 L-shaped stay
20 scribe line position sensor
21 linear motion carriage
22 rail
23 conveyor truck
24 connecting member
25 suction cup
26 electromagnetic oscillator
32 high-pressure liquid supply path
100 solar cell panel
102 scribe line
101 photoelectric conversion element layer
104 plate glass

The invention claimed is:
1. A high-pressure liquid jet cleaner for use in cleaning a thin film solar cell panel, comprising:
 a plurality of high-pressure liquid jet nozzles each configured to jet out a high-pressure liquid in a straight line from a jet hole to a corresponding one of a plurality of scribe lines to clean the scribe lines which continuously extend in a direction perpendicular to the width direction of the thin film solar cell panel and which are arranged in the width direction at consistent intervals;
 a nozzle holder holding the plurality of jet nozzles which are arranged in the longitudinal direction of the nozzle holder and which correspond to the respective scribe lines;
 a support configured to support the nozzle holder,
 a conveyor configured to convey the solar cell panel in relation to the nozzle holder in a direction that is perpendicular to the longitudinal direction of the nozzle holder and that is parallel to the direction in which the scribe lines of the solar cell panel extend continuously; and a scribe line position sensor disposed directly above one of the scribe lines, wherein the support supports the nozzle holder in a manner to allow the nozzle holder to move in the longitudinal direction of the nozzle holder, and the support includes a micro-positioning device configured to move the nozzle holder in the longitudinal direction by a micro distance for positioning the jet nozzles, the support supports the nozzle holder in a manner to allow the nozzle holder to rotate around an axis extending in the longitudinal direction of the nozzle holder, such that a direction in which the high-pressure liquid is jetted out from the jet nozzles is adjustable, the scribe line position sensor detects a position of the one of the scribe lines in advance, and based on the detected position, the micro-positioning device performs the positioning of the jet nozzles such that the high-pressure liquid jetted out from the jet nozzles hits the respective scribe lines, and each of the plurality of high-pressure liquid jet nozzles includes:
 a nozzle body with a tip hole formed in a central portion of the nozzle body; and
 a nozzle tip formed of a material having a higher hardness than a hardness of a material forming the nozzle body, the nozzle tip being embedded in the tip hole of the nozzle body, the nozzle tip having a straight let hole drilled therein at a central portion.

2. The high-pressure liquid jet cleaner for use in cleaning the thin film solar cell panel, according to claim 1, wherein a pressure at which the high-pressure liquid is jetted out from the jet nozzle is variable.

3. The high-pressure liquid jet cleaner for use in cleaning the thin film solar cell panel, according to claim 1, wherein
 the nozzle holder includes a high-pressure liquid supply path, which continuously extends in the longitudinal direction of the nozzle holder and which communicates with the plurality of jet nozzles, and
 the high-pressure liquid supply path is connected to one end of a flexible high-pressure liquid supply tube, through which the high-pressure liquid is supplied to the high-pressure liquid supply path.

4. The high-pressure liquid jet cleaner for use in cleaning the thin film solar cell panel, according to claim 1, further comprising
 a second nozzle holder which holds at least one second nozzle configured to jet out a liquid in a fan-like diffused manner to a surface of the solar cell panel at a pressure lower than the pressure of the high-pressure liquid.

5. The high-pressure liquid jet cleaner for use in cleaning the thin film solar cell panel, according to claim 1, wherein the straight jet hole extends parallel to the central axis of the nozzle body.

6. A high-pressure liquid jet cleaner for use in cleaning a thin film solar cell panel, comprising:
 a plurality of high-pressure liquid jet nozzles each configured to jet out a high-pressure liquid in a straight line to a corresponding one of a plurality of scribe lines to clean the scribe lines which continuously extend in a direction perpendicular to the width direction of the thin film solar cell panel and which are arranged in the width direction at consistent intervals;
 a nozzle holder holding the plurality of jet nozzles which are arranged in the longitudinal direction of the nozzle holder and which correspond to the respective scribe lines;
 a support configured to support the nozzle holder; and
 a conveyor configured to convey the solar cell panel in relation to the nozzle holder in a direction that is perpendicular to the longitudinal direction of the nozzle holder and that is parallel to the direction in which the scribe lines of the solar cell panel extend continuously, wherein
 each of the plurality of high-pressure liquid jet nozzles includes:
  a nozzle body with a tip hole formed in a central portion of the nozzle body; and
  a nozzle tip formed of a material having a higher hardness than a material forming the nozzle body, the nozzle tip being embedded in the tip hole of the nozzle body, the nozzle tip having a straight jet hole drilled therein at a central portion.

7. A high-pressure liquid jet cleaning method for cleaning a thin film solar cell panel, comprising:
 conveying a solar cell panel in relation to a nozzle holder in a direction perpendicular to the longitudinal direction of the nozzle holder,
  the solar cell panel including a plurality of scribe lines which continuously extend in a direction perpendicular to the width direction of the solar cell panel and which are arranged in the width direction at consistent intervals,
  the nozzle holder holding a plurality of high-pressure liquid jet nozzles each configured to jet out a high-pressure liquid in a straight line from a jet hole to a corresponding respective scribe lines and which are arranged in the longitudinal direction of the nozzle holder at consistent intervals,
  the nozzle holder being supported by a micro-positioning device configured to move the nozzle holder in the longitudinal direction of the nozzle holder,
  the solar cell panel conveying direction being parallel to the direction in which the scribe lines extend continuously, and
  a scribe line position sensor being disposed directly above one of the scribe lines;
 detecting with the scribe line position sensor a position of the one of the scribe lines in advance;
 based on the detected position, positioning the jet nozzles with the micro-positioning device such that the high-pressure liquid jetted out from the jet nozzles hits the respective scribe lines;
 rotating the nozzle holder around an axis extending in the longitudinal direction of the nozzle holder to adjust a direction in which the high-pressure liquid is jetted out from the jet nozzles; and
 jetting out a high-pressure liquid in a straight line from the jet hole of the high-pressure liquid jet nozzles to the respective scribe lines, while conveying the solar cell panel, wherein each of the plurality of high-pressure liquid jet nozzles includes:
  a nozzle body with a tip hole formed in a central portion of the nozzle body; and
  a nozzle tip formed of a material having a higher hardness than a hardness of a material forming the nozzle body, the nozzle tip being embedded in the tip hole of the nozzle body, the nozzle tip having a straight jet hole drilled therein at a central portion.

8. A high-pressure liquid jet cleaning method for cleaning a thin film solar cell panel, comprising:
 conveying a solar cell panel in relation to a nozzle holder in a direction perpendicular to the longitudinal direction of the nozzle holder, the solar cell panel including a plurality of scribe lines which continuously extend in a direction perpendicular to the width direction of the solar cell panel and which are arranged in the width direction at consistent intervals, the nozzle holder holding a plurality of high-pressure liquid jet nozzles which correspond to the respective scribe lines and which are arranged in the longitudinal direction of the nozzle holder at consistent intervals, the solar cell panel conveying direction being parallel to the direction in which the scribe lines extend continuously; and jetting out a high-pressure liquid in a straight line from the high-pressure liquid jet nozzles to the respective scribe lines, while conveying the solar cell panel, wherein each of the plurality of high-pressure liquid jet nozzles includes:

a nozzle body with a tip hole formed in a central portion of the nozzle body; and a nozzle tip formed of a material having a higher hardness than a hardness of a material forming the nozzle body, the nozzle tip being embedded in the tip hole of the nozzle body, the nozzle tip having a straight jet hole drilled therein at a central portion.

9. The high-pressure liquid jet cleaning method for cleaning the thin film solar cell panel, according to claim 8, further comprising:

moving the nozzle holder in the longitudinal direction thereof by a micro distance for positioning the nozzle holder, and jetting out the high-pressure liquid from the high-pressure liquid jet nozzles after moving the nozzle holder in the longitudinal direction thereof by the micro distance for positioning the nozzle holder.

10. The high-pressure liquid jet cleaning method for cleaning the thin film solar cell panel according to claim 8, further comprising:

rotating the nozzle holder around an axis extending in the longitudinal direction of the nozzle holder to adjust a direction in which the high-pressure liquid is jetted out from the jet nozzles; and jetting out the high-pressure liquid from the high-pressure liquid jet nozzles after rotating the nozzle holder around an axis extending in the longitudinal direction of the nozzle holder to adjust a direction in which the high-pressure liquid is jetted out from the jet nozzles.

* * * * *